(12) United States Patent
Zhao et al.

(10) Patent No.: US 8,514,673 B1
(45) Date of Patent: Aug. 20, 2013

(54) LAYERED NEAR-FIELD TRANSDUCER

(75) Inventors: Tong Zhao, Eden Praire, MN (US); Michael Christopher Kautzky, Eagan, MN (US); Amit Itagi, Hugo, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/455,004

(22) Filed: Apr. 24, 2012

(51) Int. Cl.
*G11B 11/00* (2006.01)
(52) U.S. Cl.
USPC ..................................... 369/13.33
(58) Field of Classification Search
USPC .......... 369/13.33, 13.32, 13.13, 13.17, 13.02, 369/112.27, 59; 385/31, 131
See application file for complete search history.

(56) References Cited

U.S. PATENT DOCUMENTS

| | | | |
|---|---|---|---|
| 7,330,404 B2 | 2/2008 | Peng et al. | |
| 7,671,995 B2 | 3/2010 | Lin et al. | |
| 8,031,341 B2 | 10/2011 | Quesnel et al. | |
| 2005/0078565 A1* | 4/2005 | Peng et al. | 369/13.32 |
| 2010/0123965 A1* | 5/2010 | Lee et al. | 360/59 |
| 2010/0208378 A1* | 8/2010 | Seigler et al. | 360/59 |
| 2010/0315735 A1 | 12/2010 | Zhou et al. | |
| 2011/0205863 A1* | 8/2011 | Zhao et al. | 369/13.33 |
| 2011/0228420 A1* | 9/2011 | Hara et al. | 360/59 |
| 2011/0292774 A1* | 12/2011 | Osawa et al. | 369/13.33 |
| 2012/0045662 A1* | 2/2012 | Zou et al. | 428/810 |
| 2013/0064502 A1* | 3/2013 | Peng et al. | 385/31 |

* cited by examiner

*Primary Examiner* — Thang Tran
(74) *Attorney, Agent, or Firm* — Hollingsworth Davis, LLC

(57) ABSTRACT

A near-field transducer includes a substrate that defines a substrate-parallel plane. The near-field transducer also includes a composite layer deposited on the substrate-parallel plane. The composite layer has a first layer of the plasmonic material and a second layer of an insertion material adjacent the substrate. The insertion material reduces plastic deformation of the near-field transducer at elevated temperatures.

20 Claims, 11 Drawing Sheets

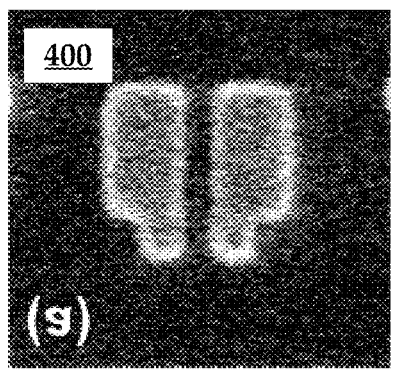 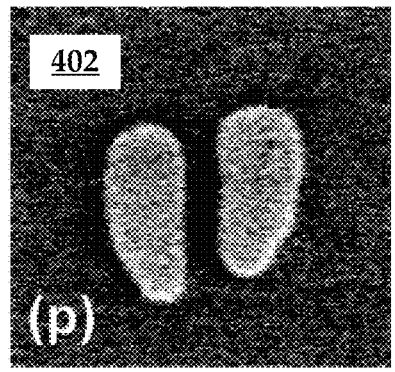
FIG. 4A            FIG. 4B
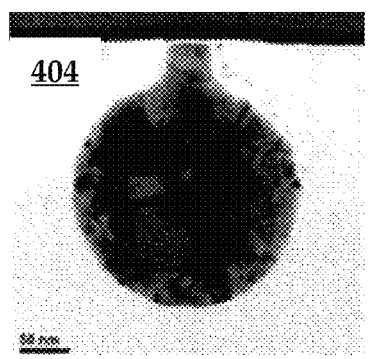 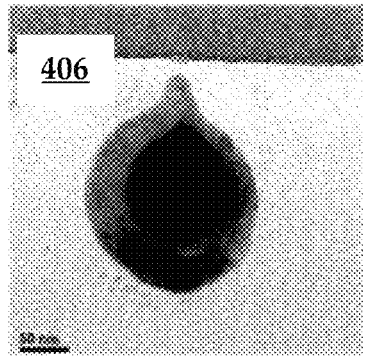
FIG. 4C            FIG. 4D
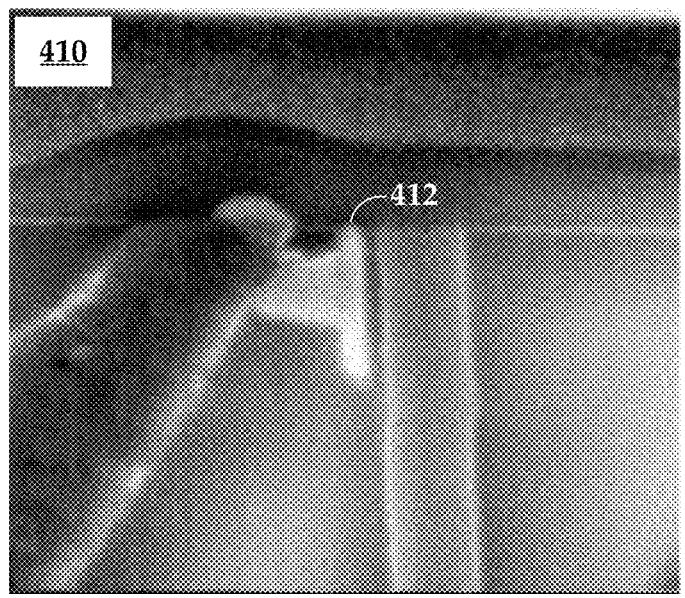
FIG. 4E

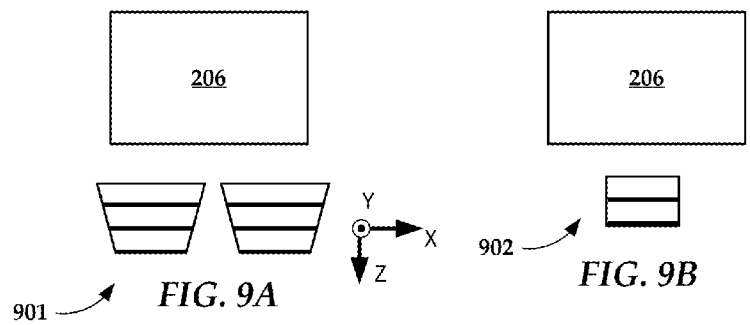
FIG. 9A  901
FIG. 9B  902
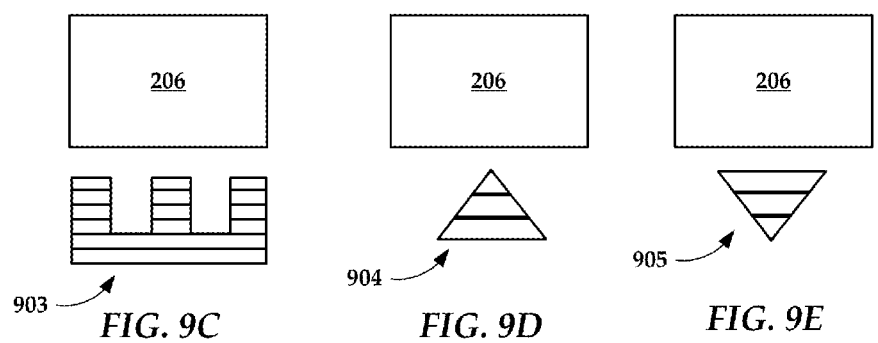
FIG. 9C  903
FIG. 9D  904
FIG. 9E  905
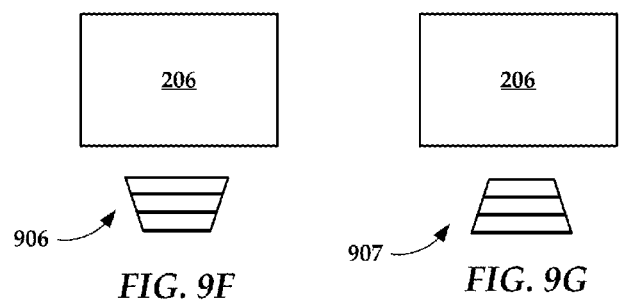
FIG. 9F  906
FIG. 9G  907

LAYERED NEAR-FIELD TRANSDUCER

BACKGROUND

The present disclosure relates to optical components used in applications such as heat assisted magnetic recording (HAMR). A HAMR device utilizes a magnetic recording media (e.g., hard drive disk) that is able to overcome superparamagnetic effects that limit the areal data density of typical magnetic media. In order to record on this media, a small portion of the media is locally heated while being written to by a magnetic write head. A coherent light source such as a laser may provide the energy to create these hot spots, and optical components, e.g., built in to a slider that houses the write head, are configured direct this energy onto the media. This approach to magnetic recording may also be referred to as thermal assisted magnetic recording (TAMR). Also, similar approaches may be used in other types of data recording, such as in magneto-optical (MO) systems.

SUMMARY

One embodiment described herein is directed to a near-field transducer including a substrate that defines a substrate-parallel plane. The near-field transducer also includes a composite layer deposited on the substrate-parallel plane. The composite layer has a first layer of the plasmonic material and a second layer of an insertion material adjacent the substrate. The insertion material reduces plastic deformation of the near-field transducer at elevated temperatures.

In another embodiment, a method involves forming first layer of insertion material on a substrate to form a planar structure of a near-field transducer. A second layer of plasmonic material is formed on the first layer. The first and second layer form a first composite layer of the near-field transducer, and the insertion material reduces plastic deformation of the near-field transducer at elevated temperatures.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 4A-4E are scanning electron microscope images illustrating how elevated temperatures may affects a near-field transducer according to another example embodiment;

FIGS. 9A-9G are block diagrams illustrating example near-field transducer arrangements utilizing multi-layer structures according to example embodiments;

DETAILED DESCRIPTION

Figure 1:
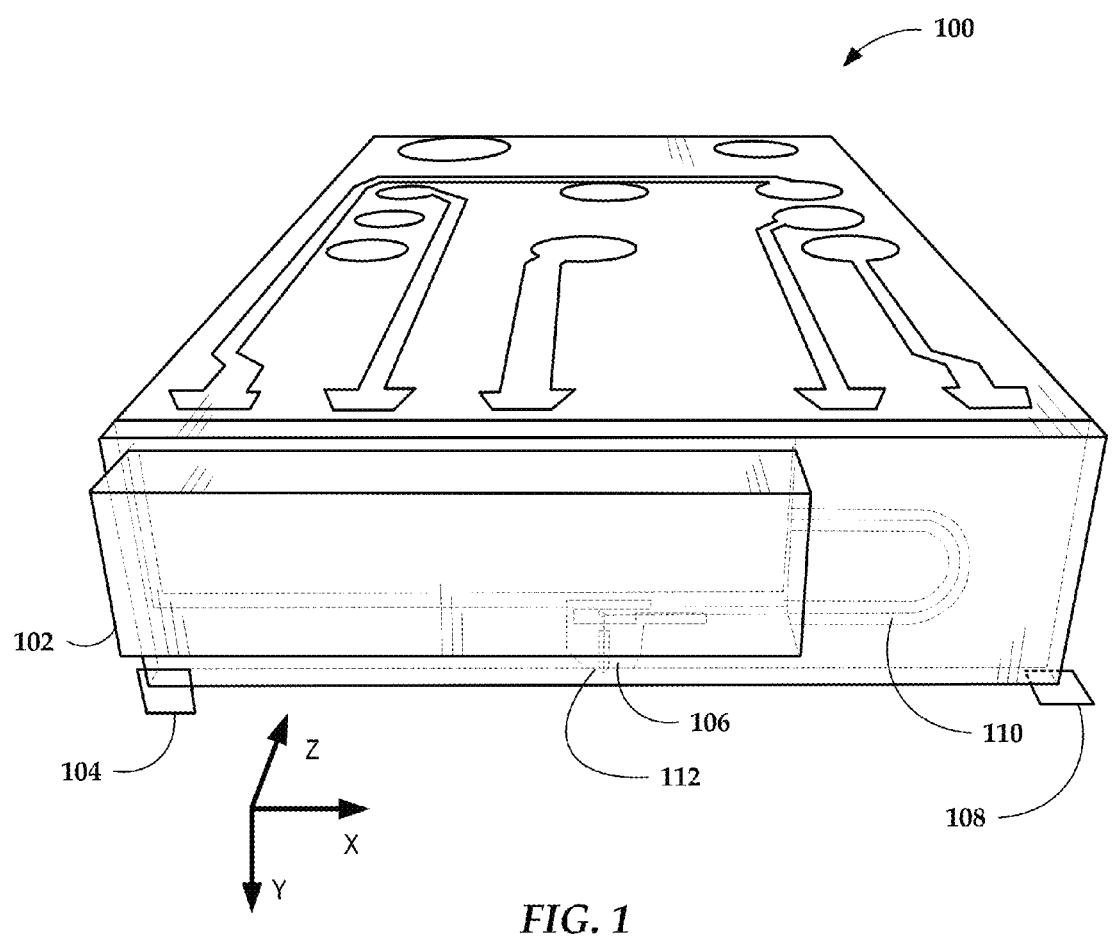
FIG. 1 is a perspective view of a thermal assisted recording slider utilizing a near-field transducer according to an example embodiment.

The present disclosure relates to a light delivery system for use in applications where a beam of highly focused and relatively powerful electromagnetic energy is desired. As mentioned above, one such application is in thermal/heat assisted magnetic recording, referred to herein as HAMR. In reference now to FIG. 1, a perspective view shows an example HAMR slider 100. This example slider 100 includes an edge-emitting laser diode 102 integrated into a trailing edge surface 104 of the slider 100. The laser diode 102 is proximate to a HAMR read/write head 106, which has one edge on an air bearing surface (ABS) 108 of the slider 100. The ABS 108 faces and is held proximate to a moving media surface (not shown) during device operation.

The laser diode 102 provides electromagnetic energy to heat the media surface at a point near to the read/write head 106. Optical coupling components, such as a waveguide 110, are formed integrally within the slider device 100 to deliver light from the laser 102 to the media. In particular, a portion of waveguide 110 and an NFT 112 may be located proximate the read/write head 106 to provide local heating of the media during write operations. While the laser diode 102 in this example is an integral, edge firing device, it will be appreciated that the waveguide/NFT 112 may be applicable to any light source and light delivery mechanisms. For example, surface emitting lasers (SEL) may be used instead of edge firing lasers, and the slider 100 may use any combination of integrated and external lasers.

A HAMR device utilizes optics to heat a magnetic recording media (e.g., hard disk) in order to overcome superparamagnetic effects that limit the areal data density of typical magnetic media. In order to record on this media, a small portion of the media is locally heated above the Curie temperature while being written to by a magnetic write head. A coherent light source such as a laser may provide the energy for this heating operation, and optical components, e.g., built in to a slider that houses the write head, are configured direct this energy onto the media.

When applying light to a HAMR medium, the light is concentrated into a small hotspot over the track on the media surface where writing takes place. To create this small hot spot, energy from the light source is launched into a waveguide integrated into a hard drive head. The light propagates through the waveguide and may be coupled to an optical NFT, e.g., either directly from the waveguide or by way of a focusing element. The NFT focuses and emits the light onto the media surface to heat the media.

Figure 2:
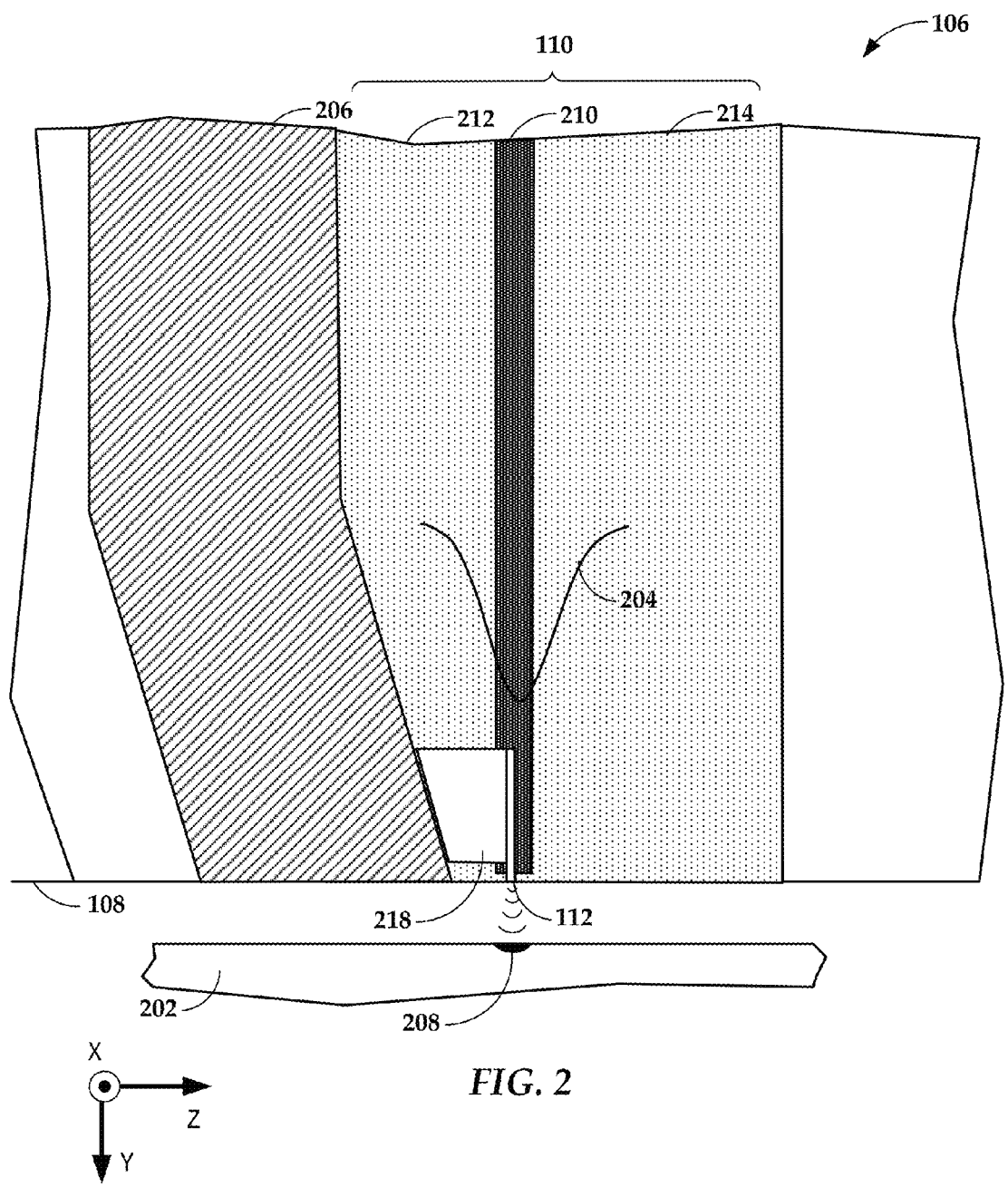
FIG. 2 is a cross-sectional view of a waveguide, write pole, and near-field transducer according to an example embodiment.

In FIG. 2, a cross-sectional view illustrates portions of a read/write head 106 according to an example embodiment. In this view, the ABS 108 and NFT 112 are proximate to a surface of a magnetic medium 202, e.g., a magnetic disk. The waveguide 110 delivers electromagnetic energy 204 to the NFT 112, which directs the energy to create a small hotspot 208 on the medium 202. A magnetic field is induced via a magnetic write pole 206, which causes changes in magnetic flux near the ABS 108 in response to an applied current. Flux from the write pole 206 changes a magnetic orientation of the hotspot 208 as the hotspot 208 moves past the write pole 206 in the downtrack direction (z-direction).

The waveguide 110 and NFT 112 may be formed integrally within a slider that houses the read-write head 106. These and other optical elements used in HAMR recording heads are generally known as integrated optics devices. Integrated optics devices are components constructed on substrates, sometimes in combination with electronic components. Integrated optics device may be formed using processes similar to those used for semiconductor production, e.g., layer deposition.

For example, the waveguide 110, which transfers light from a laser (e.g., laser diode 102 in FIG. 1) to the NFT 112, can be formed by depositing dielectric materials on a substrate using techniques such as atomic layer deposition, photoresist etching, chemical-mechanical planarization (CMP), etc. The layers of the waveguide 110 may have differing optical properties, e.g., with middle layer 210 having a refractive index $n_1$, and top and bottom layers 212, 214 having refractive indices $n_2$ and $n_3$. In configurations such as where $n_1 > n_2$, and $n_1 > n_3$, the middle layer 210 acts as a core and the top and bottom layers 212, 214 act as cladding (similar to an optic fiber) so that light propagates efficiently through the waveguide 110.

The NFT 112, write pole 206, and other illustrated components may be formed using similar layer deposition techniques as the waveguide 110. Generally, a plasmonic device such as NFT 112 is used to focus the energy 204 on to the medium 202 instead of an optical device such as a lens or mirror, which may be diffraction limited at this scale. As a result, the energy 204 is delivered from the waveguide 110 to medium 202 via the NFT 112. The NFT 112 is made of a material (e.g., Au, Ag, Cu, Al) that emits a field of surface plasmons at resonance. The NFT 112 is shaped to direct the plasmon field to the surface of the medium 202.

In this example, the NFT 112 is disposed within the waveguide core 210, although other orientations may be used. For example, the waveguide core 210 may be terminated behind the NFT 112, e.g., in the negative y-direction. The dimensions and/or location of the waveguide 110 may be adjusted so that the NFT 112 is disposed on or near one of the cladding layers 212, 214 instead of the core 210. The waveguide 110 may include other features that are not shown in FIG. 2, such as a solid immersion mirror (SIM) or solid immersion lens (SIL) that focuses light on to the NFT 112.

The energy applied to the NFT 112 to create the hotspot 208 can also cause a significant temperature rise in the NFT 112. The NFT 112 may be formed as a peg, pin, bar, or other protrusion having relatively small dimensions in order to keep the generated plasmonic field small. As a result, a heat sink 218 may be formed proximate to (or integral with) the NFT 112. The heat sink 218 may draw heat away from the NFT 112, and be thermally coupled to other components (e.g., the write pole 206) in order to dissipate the heat.

Figure 3A:
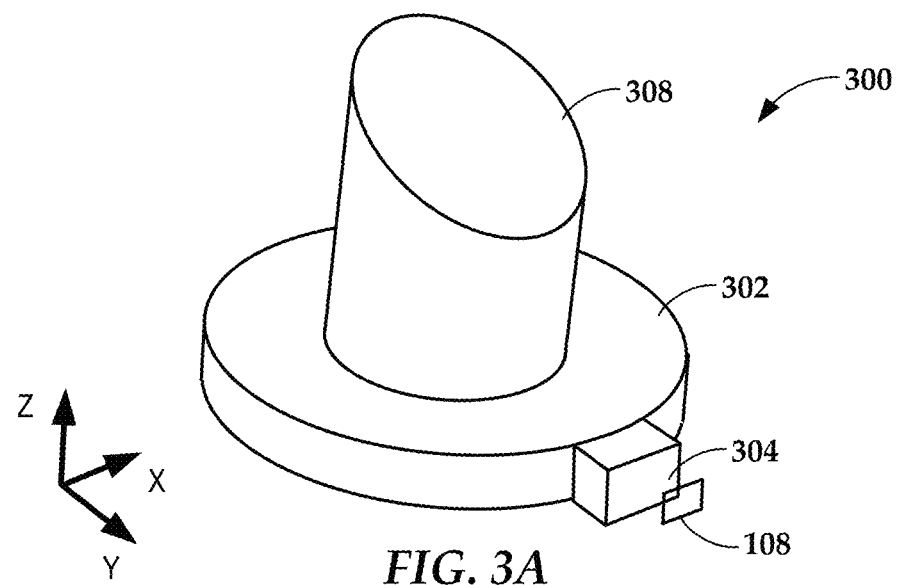
FIGS. 3A and 3B are perspective views of near-field transducer geometries according to example embodiments.
Figure 3B:
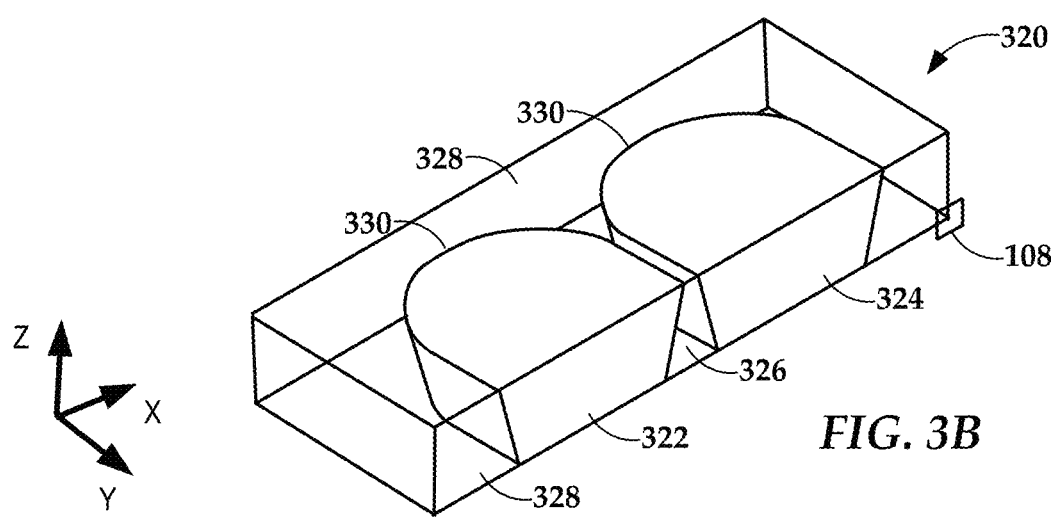

In the discussion that follows, example NFT geometries are shown in FIGS. 3A-3B. These geometries are presented for purposes of illustration and not limitation. The claimed subject matter may apply to NFT configurations different than those illustrated in FIGS. 3A-3B and elsewhere herein. In FIG. 3A, a perspective view shows an NFT geometry 300 that includes a circular disk 302 lying on the x-y plane. The disk 302 is coupled to a peg 304, the end of which extends to the ABS 108. This NFT geometry 300 may be referred to herein as the "lollipop" NFT configuration. The disk 302 may be placed in the focal point of a SIM or the like, and the generated plasmons radiate from the peg 304 to a media surface. Also seen in this view is a heat sink 308, that may be considered as either integral to or separate from the NFT 300. The heat sink 308 provides a thermal conductive path, e.g., to a magnetic pole or other structure, such as seen by heat sink 218 and pole 206 in FIG. 2.

In FIG. 3B, a perspective view shows another NFT geometry 320. This NFT 320 is configured as side-by-side elongated plates 322, 324 with a gap 326 therebetween. The plates 322, 324 are disposed on the x-y plane, and the gap 326 runs in the y-direction from an excitation location 328 to the ABS 108. The gap 326 and surrounding areas 328 may be filled with a dielectric material. The plates 322, 324 are curved/chamfered at waveguide facing ends 330 in order to improve coupling with a waveguide (not shown). This arrangement may be referred to herein as the "gap" NFT.

In these and other configurations, temperature of the NFT may significantly increase at plasmonic resonance. At resonance, significant energy is being concentrated in a small volume, such as parts of the NFT near the ABS. For example, the peg 304 in FIG. 3A has reduced volume compared to the NFT as a whole, and is positioned in a location of high energy density. A similar concentration of energy in a small volume may occur along the narrow parts of the gap 326 of the NFT design 320 in FIG. 3B. Portions of the plates 322, 324 and peg 304 may be exposed at ABS, and thus may be subject to mechanical wearing as well.

The NFT performance (e.g., endurance, efficiency) may be influenced by thermal and mechanical stresses during HAMR operation. Due to its superior electromagnetic and optical properties, gold (Au) is often used to form plasmonic resonator/antenna of the NFT (e.g., disk/peg 302/304 in FIG. 3A, and plates 324, 326 in FIG. 3B). However gold has relatively poor mechanical strength compared to other metals, and gold NFT devices have shown various types of degradation or failure at elevated temperature.

In the present case, thermal modeling performed on NFT configurations shown above indicates NFT temperature during HAMR operation may reach up to 400° C. in a lollipop-type configuration and up to 250° C. in a gap-type configuration. This heating is due to both to the laser light emitted from the NFT, and from writer and reader heaters. Example gold NFT components were built and subjected to these levels of heat. Failure modes of these example NFT components are shown in scanning electron microscope (SEM) images of FIGS. 4A-4E.

In FIGS. 4A and 4B, SEM images 400, 402 show respective outline shapes of a gap NFT before and after annealing. The SEM images 400, 402 are plan views of the NFT, e.g., looking down on the xy-plane in FIG. 3B. The image 400 in FIG. 4A shows the as-manufactured shape of the NFT. In this example, the ABS has not yet been formed, but would be seen as a horizontal line intercepting the top of the NFT. The protrusions seen in image 400 face away from the ABS. The image 402 in FIG. 4B shows the shape of the same device after annealing at 230° C. for three minutes in air. As FIG. 4B shows, the Au NFT shape was rounded by annealing due to reflow of Au at high temperature. This type of deformation of the NFT shape will reduce coupling efficiency to transfer laser energy into magnetic media.

In FIGS. 4C and 4D, SEM images 404, 406 show respective before and after shapes of a lollipop NFT (e.g., NFT 300 in FIG. 3A) that is annealed at 500° C. These images 404, 406 are plan views of the NFT, e.g., the xy-plane in FIG. 3A. The ABS is visible in these images 404, 406 (e.g., dark shaded portion proximate the NFT peg). As seen in FIG. 4D, after annealing, the NFT peg is recessed from the ABS, potentially preventing delivery of laser light to magnetic media. Similar recession can also happen during manufacturing processes such as lapping. Gold is a soft metal and can be easily overlapped (e.g., have too much material removed during the lapping process). This may leave voids in NFT on the surface being treated. Generally, a soft metal such as gold may have unwanted voids, deformations, and/or protrusions on any surface that is subject to thermal processing (e.g., annealing), chemical processing (e.g., etching), mechanical processing (e.g., planarization), etc.

In FIG. 4E, an SEM image 410 shows a cross section of slider assembly that uses a lollipop style NFT. This image 410 is a yz-plane cross sectional view such as shown in FIG. 2, except that the positive y-axis points up in FIG. 4E. The image 412 was taken after the area surrounding the NFT was annealed to 350° C. The NFT is protruding into the ABS at portion 412. This protrusion may result in a void elsewhere (e.g., near the portion 412 or away from the ABS) due to loss of the protruding material. The protruding material may also contaminate the ABS during operation, e.g., in response to head-to-media contact.

Based on current analyses and assumptions of HAMR thermal performance, pure gold NFT components may exhibit the above-described failure modes during normal operation. Other plasmonic materials such as copper, silver, etc., are also relatively soft metals, and so may exhibit similar failures. As a result, alternative approaches are desirable to ensure the NFT devices can operate reliably for long-term in a HAMR system.

Figure 5A:
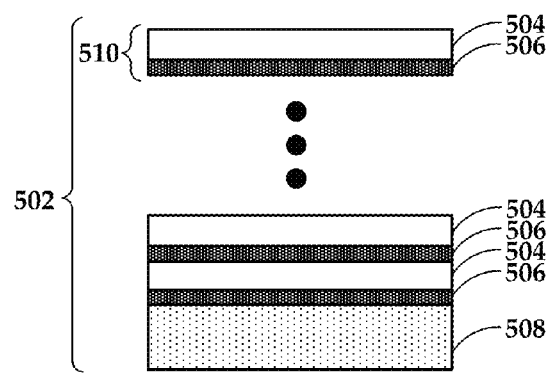
FIG. 5A is a block diagram of a multi-layer structure according to an example embodiment.

One approach described herein, and shown in FIG. 5A, is to form an NFT using a multilayer structure 502. The structure 502 is formed by alternatively layering plasmonic materials 504 with other materials 506 (referred to herein as "insertion materials"). The structure 502 includes at least one plasmonic layer 504 and at least one insertion material layer 506, and may be built on top of a substrate 508 (e.g., $Si/SiO_2$). For purposes of discussion, an adjacent plasmonic layer 504 and insertion layer 506 are referred to collectively as a composite layer 510, and the structure 502 may be formed from one or more stacked composite layers 510.

The insertion materials 506 may be non-plasmonic, and are chosen to increase mechanical stability of the NFT under high temperature conditions. A multilayer structure 502 can be used to form an NFT having a shape and dimensions as described above, e.g., in FIGS. 3A-3B. This will result in a device with comparable optical performance to single layer NFT (solid gold, for example) but with improved mechanical properties.

A multilayer approach can provide enhanced mechanical strength through improved grain stabilization, hardness and creep resistance. Compared to an alloying approach, a multilayer structure's benefits may include ease of fabrication and preserving the optical properties of the plasmonic materials. In a multilayer structure, incoherent interfaces between different materials block dislocation and other defects from penetrating through the interface. These dislocations/defects may be a cause of reduced mechanical strength and can potentially result in plastic deformation at high temperatures. Using a multilayer structure 502, improved grain stability, hardness, and higher resistance to stress relaxation are expected. This results in an NFT (or other integrated optical component) with improved mechanical strength and better stability at elevated temperatures.

By properly selecting the insertion material(s) 506, texture can be facilitated in plasmonic materials (e.g., gold) that will improve mechanical strength of the plasmonic layers 504. By keeping the layer thickness of the insertion material 506 relatively thin enough (e.g., on the order of 1 nm), the impact on optical properties of the NFT may be minimized, thereby preserving NFT coupling efficiency.

Material selection for plasmonic layers 504 include: Au, Ag, Al, Cu, and alternative materials listed in U.S. Patent Publication 2011/0205863 entitled "HAMR NFT Materials with Improved Thermal Stability," filed Feb. 23, 2011, which is hereby incorporated by reference in its entirety. For the insertion layer(s) 506, materials having low solubility with the plasmonic layer 504 may be used to improve thermal stability. One option for the insertion layer 506 includes materials such as W, TiW, Rh, Ru, Zr, Ta, Ti, Sc, etc., and alloys thereof which are refractory metals of low solubility in Au, Ag, Al, Cu, etc. Another material usable for the insertion layer 506 is a metal oxide, e.g., one with low optical loss, such as ZrO, TiO, VO, WO, etc. Yet another class of materials that could be used for the insertion layer includes nitrides, preferably conductive, such as TiN, ZrN, etc.

Figure 5B:
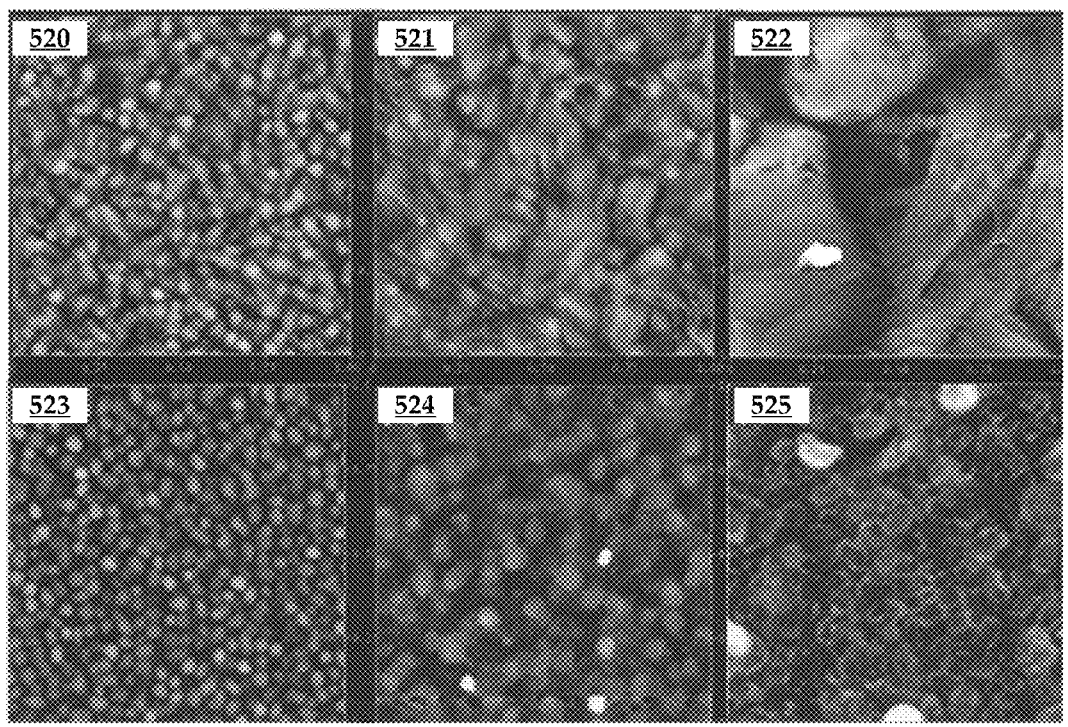
FIG. 5B is a series of atomic force microscopy images illustrating affect on surface grain structures by utilizing a multi-layer device according to an example embodiment.

In reference now to FIG. 5B, a series of atomic force microscopy (AFM) surface morphology images are used to compare thermal performance of single layer and multilayer structures. The top row (images 520-522) includes surface images of an Au (150 nm) single-layer film. The bottom row (images 523-525) includes surface images of a multilayer film of 10 composite layers, each composite layer formed of TiW (1 nm) and Au (15 nm). Both of these films are deposited in a $Si/SiO_2$ substrate. The images 520-525 indicate, from left to right, the changes in surface morphology after different thermal treatments have been applied to the films. The leftmost images 520, 523 show as-grown surface morphology before any thermal treatments have been applied. The middle images 521, 524 show surface morphology after annealing at 200° C., and the rightmost images 522, 525 show surface morphology after annealing at 400° C.

Figure 6:
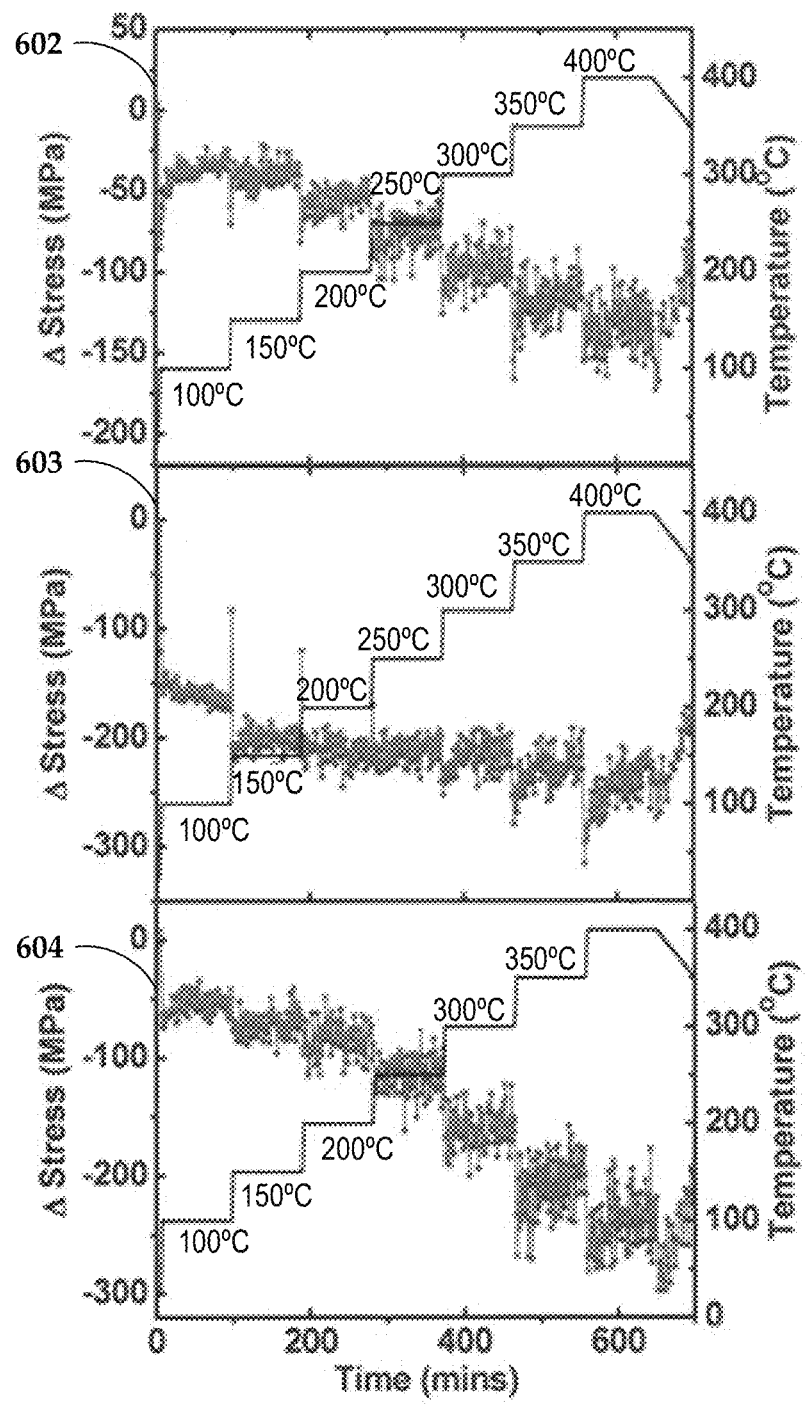
FIG. 6 is a series of graphs illustrating stress variation as function of temperature and hold time for structures according to example embodiments.
Figure 7A:
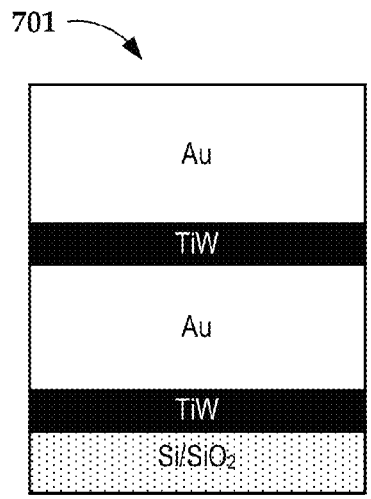
FIGS. 7A-7E are block diagrams of various multi-layer structures according to example embodiments.
Figure 7B:
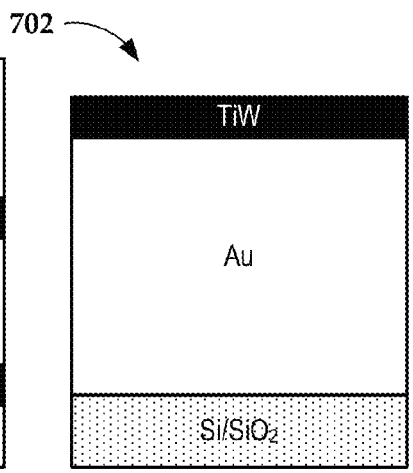
Figure 7C:
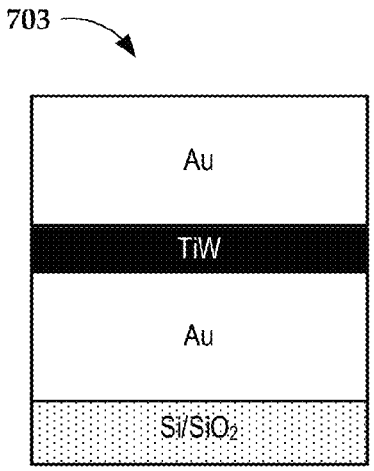
Figure 7D:
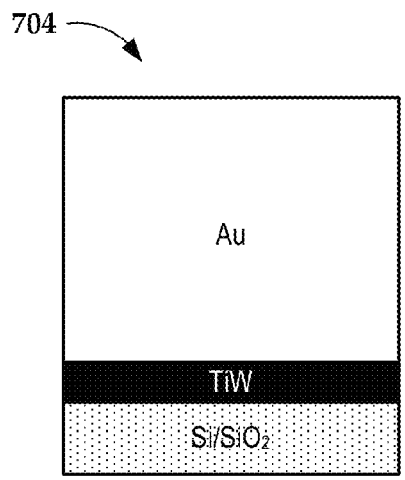
Figure 7E:
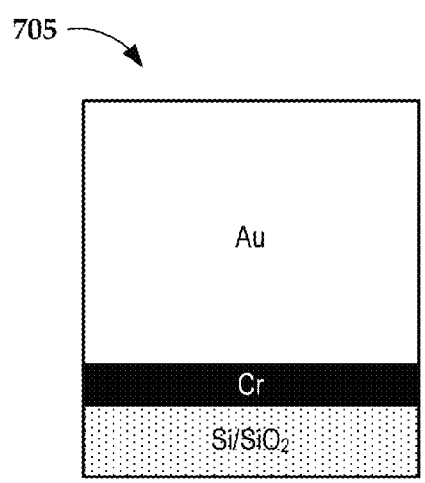

As images 523-525 of FIG. 5B show, adding multiple 1 nm TiW layers into a 150 nm Au film promotes more regular grain structures at elevated temperatures. After annealing, substantial grain growth occurs in the single-layer Au film even after 200° C. annealing (image 521). In the TiW/Au multilayer structure, however, the grain growth is dramatically slowed down even after 400° C. annealing (image 525), indicating much improved Au grain stability. The improved mechanical stability is further confirmed by the measurement of stress as a function of temperature and holding time, as shown in graphs 602-604 of FIG. 6.

Each of graphs 602-604 show measured changes in stress in thin film structure along with variations in ambient temperature that induce stresses in the structure. The temperature measurements are indicated by the stepped curve that increases on the graph from left to right (from 100° C. to 400° C.), and is marked with temperature values where such marking does not obscure other data. The stress measurements are the jagged curves that generally decrease in value from left to right on the graph. Graph 602 shows results for an Au (150 nm) single-layer film, graph 603 shows results for a 10 composite layer film of TiW (1 nm)/Au (15 nm), and graph 604 shows results for a single composite layer Ti (5 nm)/Au (150 nm). All of these films are built upon a $Si/SiO_2$ substrate.

Generally, a component that exhibits less change in relative stress (or "stress relaxation") as temperature increases will tend to be more mechanically stable across the temperature range. As seen in graph 603, the 10 composite layer structure exhibits relatively little stress relaxation between 150° C. and 350° C., compared to graphs 602 and 604, where stress relaxation is fairly constant over the range. As seen in graph 604, stress relaxation is also pushed up to 300° C., similar to the multilayer structure in graph 603, with improvement from a single layer structure as in graph 602. At around 400 C, the single-layer Au film shows significant reduction in stress It is contemplated that forming an NFT (or other integrated optics device) using at least one composite layer can improve mechanical performance at elevated temperatures. In a full build experiment, a lollipop-style NFT (see NFT geometry 300 in FIG. 3A) was formed using peg 304 made from a bilayer structure of TiW (1 nm)/Au (25 nm). Reliability testing of this bilayer configuration showed a 10 times improvement in reliability as well as 10% increase of recording areal density. These results indicate the effectiveness of a multilayer approach to enhance mechanical performance of plasmonic metals such as Au.

In order to gauge how a multilayer NFT performs in terms of coupling efficiency (e.g., measure of how much of the energy applied to the NFT reaches the media), a number of analyses were performed using example structures 701-705 as shown in FIGS. 7A-7E. The gold layers in these structures 701-705 totaled 18 nm in height. So for structures 701 and 703 where the insertion layer is in the middle, the Au layers are 9 nm each. The insertions layers are 1 nm for all of structures 701-705, and are TiW for all except structure 705, where Cr is used.

Figure 8:
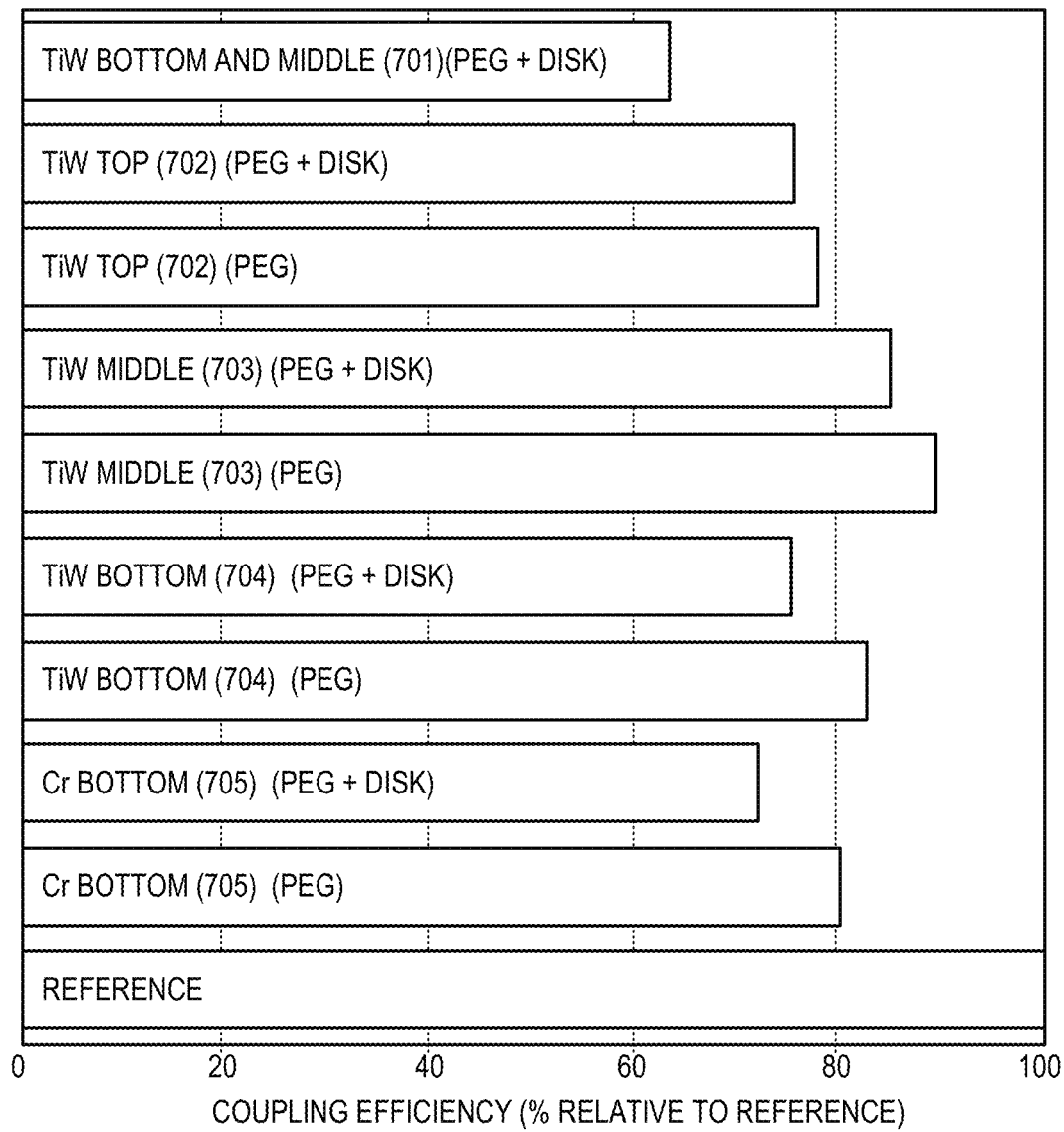
FIG. 8 is a bar graph illustrating relative optical coupling efficiency for various multi-layer structures according to example embodiments.

The results of the analyses are shown in the bar graph of FIG. 8. The NFT was modeled as a lollipop-style NFT geometry 300 as shown in FIG. 3A. As indicated in the results of FIG. 8, the peg alone or peg-plus-disk were formed from a composite bilayer. Where only the peg was formed from a composite layer, the disk was formed using a layer of solid Au. In each result, the configuration of the layer is described and the results also include a reference number indicating one of the configurations shown in FIGS. 7A-7E (e.g., "TiW top" corresponds to configuration 702 in FIG. 7). The analysis results in FIG. 8 are expressed as a percentage of coupling efficiency compared to a reference efficiency, which is the efficiency of a solid Au NFT of the same lollipop-style design. A number of configurations show a relative of efficiency of 80% or more compared to the reference. Relative efficiencies of 80% or more are considered to be acceptable in current HAMR recording systems, although in some situations (e.g., higher power laser diodes become available) lower efficiencies may still produce a viable HAMR system.

In the examples described above, two particular NFT configurations, lollipop and gap, were described as utilizing multilayer structures for at least part of the NFT. Examples of these configurations, viewed from the ABS (e.g., xz-plane), are shown in FIGS. 9A and 9B. In FIG. 9A, a layered gap NFT 901 is shown proximate at least part of a recording pole 206 such as is shown in FIG. 2. In FIG. 9B, the NFT 902 may represent a lollipop-configuration, which would appear as a rectangle as viewed from the ABS. This NFT 902 could also represent any other shape that has a rectangular projection on the ABS.

Additional alternative NFT configurations are shown in FIGS. 9C-9G, all of which are views as seen from the ABS or ABS-parallel plane. In all of FIGS. 9C-9G, at least a portion of the magnetic pole 206 is shown relative to locations of the different NFT configurations 903-907. In any of the configurations 9A-9G, the NFTs 901-907 may include a protrusion (e.g., peg) extending towards the ABS, similar to pegs/protrusions 304 shown in FIG. 3A. In such a case, the protrusion and/or the body of the NFT 901-907 may be formed using a multi-layer construction.

It will be appreciated that the NFTs 901-907 may use any number of composite layers, and the layers may be formed from any combination of plasmonic and insertion materials described herein. Further, different composite layers may be used in the same NFT, e.g., a layer of Au/TiW on top of a layer of Au/Cr, where such arrangement may provide other benefits besides increasing mechanical stability. For example, an insertion layer closer to the magnetic pole 206 may be chosen due to superior thermal conductivity to facilitate better heat transfer to the magnetic pole.

Figure 10:
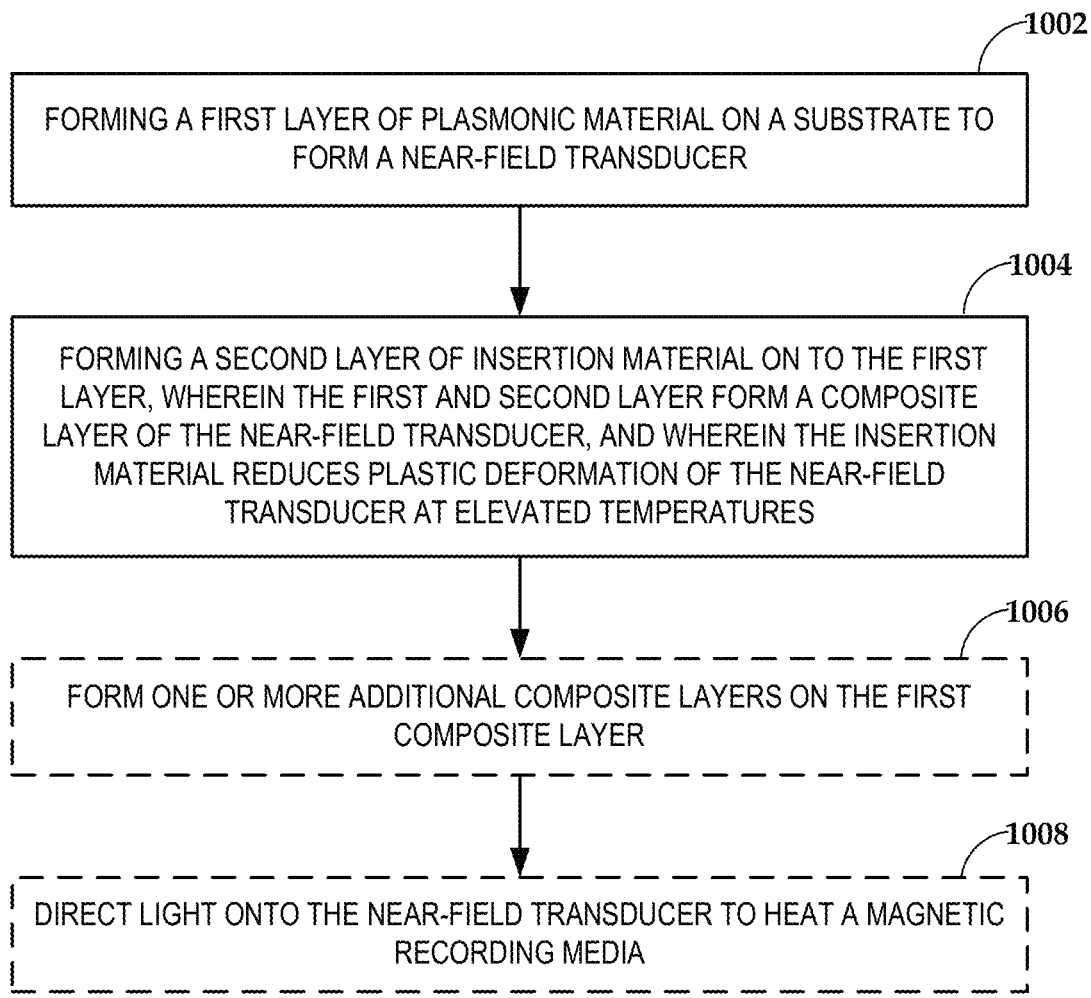
FIG. 10 is a flowchart illustrating a procedure according to an example embodiment.

In reference now to FIG. 10, a flowchart illustrates a procedure according to an example embodiment. A first layer of plasmonic material is formed 1002 on a substrate to form a near-field transducer. A second layer of insertion material is formed 1004 on the first layer. The first and second layer form a first composite layer of the near-field transducer, and the insertion material reduces plastic deformation of the near-field transducer at elevated temperatures. The procedure may optionally involve forming 1006 one or more additional composite layers on the first composite layer. The procedure may also optionally involve directing 1008 light on the near-field transducer to heat a magnetic recording media.

In thin film materials devices, alloy material may be used for tailoring properties in many different regards. In some cases the doping level is low, such as 1% or lower for desired properties. For example, in a HAMR NFT, low doping levels may be needed to preserve the plasmonic properties of the NFT. Doping a material into another may currently be done in at least two different ways. One way involves sputtering a single alloy target with desired composition onto a substrate. In some cases, this may create challenges on target fabrication and may lead to poor control of the exact composition in the deposited material. Another method to dope one material into another is to co-sputter from two separate targets with different sputtering rates to form the desired composition in films. This approach may be complex and difficult to maintain for some mass produced devices.

An alternative to the doping methods described above is to utilize multilayer structures described above to achieve low level doping in thin film materials. For example, a multiple discrete layers of material may be applied, each layer including the desired element and sized in proportion to the desired mixing ratio. A heat treatment may follows formation of some or all of the layers. The heat treatment diffuses the elements into each other, and this mixing can form the desired composition. This multilayer approach may be easier to incorporate into the deposition process and may provide for more accurate composition control. Accurate composition control can help reduce 'the number of scrapped wafers due to incorrect composition and/or the cost of fabrication with fewer targets.

Figure 11A:
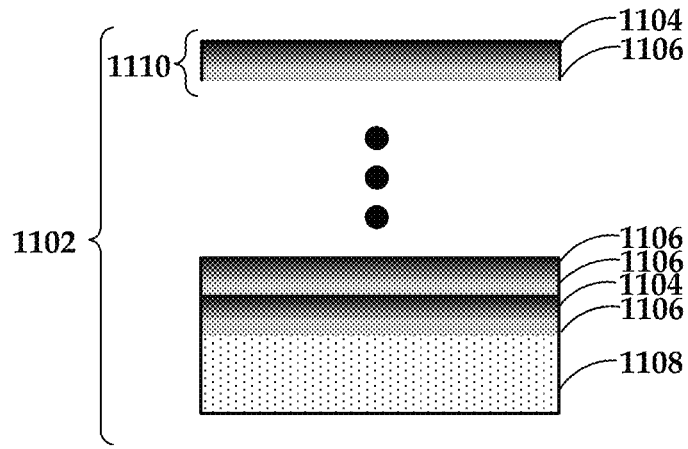
FIG. 11A is a block diagram of a multi-layer structure according to another example embodiment.

In reference now to FIG. 11A, a block diagram illustrates a multilayer structure 1102 according to an example embodiment. The structure 1102 includes first and second material layers 1104, 1106, and may be built on top of a substrate 1108 (e.g., Si/SiO2). For purposes of discussion, two adjacent material layers 1104, 1106 are referred to collectively as a composite layer 1110, and the structure 1102 may be formed from one or more stacked composite layers 1110. As will be described below, the layers 1104, 1106 are processed to partially or fully diffuse materials between layers 1104, 1106, such that after processing, composite layers 1110 may include smooth gradations of materials, or may be substantially homogeneous depending on the level of diffusion between layers 1104, 1104

The layers 1104, 1106 may be plasmonic or non-plasmonic, and may be chosen to increase mechanical stability of the NFT under high temperature conditions. The illustrated multilayer structure 1102 can be combined with other multilayer structures, such as structure 502 in FIG. 5A. For example, a diffused structure 1102 of plasmonic and non-plasmonic materials may be topped by a discrete structure 502 that has a pure plasmonic outer layer. This will result in a device with comparable optical performance to single layer NFT (solid gold, for example) but with improved mechanical properties.

The materials used forming structure 1102 may have high solubility and diffusion rate. The configuration of the multi-layer structure 1102 is selected in such a way that desired composition will be created by mixing all the layers. An increased number of layers may prove effective and efficient due to more interfaces for diffusion and mixing the two different materials during heat treatment. The heat treatment can be done in a number of different ways. For example, the wafer may be heated during deposition of layers 1104 and/or 1106, in which case Diffusion and mixing happens during the deposition. In another arrangement, post-annealing may be performed after depositing some or all layers 1104, 1106 at a lower temperature (e.g., room temperature or lower). In this case, diffusion and mixing will happen during the annealing.

Figure 11B:
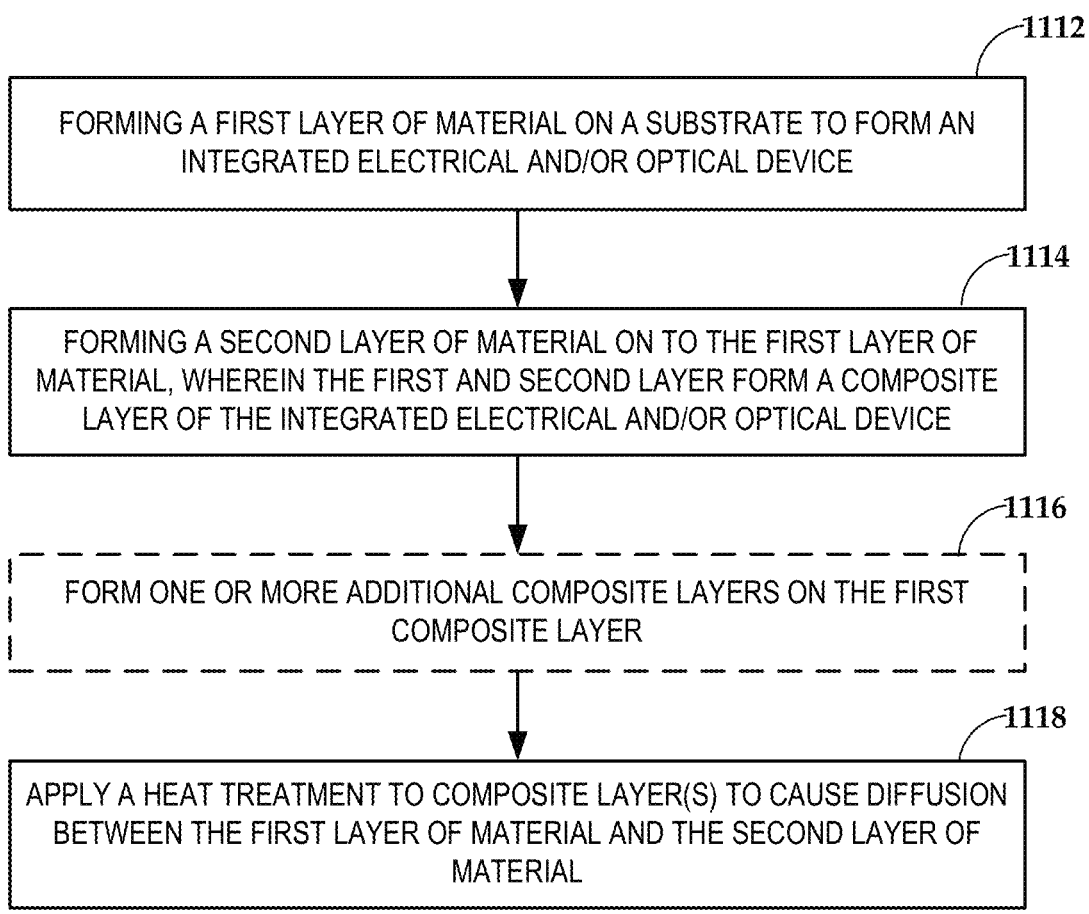
FIG. 11B is a flowchart illustrating a procedure according to another example embodiment.

In FIG. 11B, a flowchart illustrates a procedure according to an example embodiment. A first layer of material is formed 1112 on a substrate to form an integrated electrical and/or optical device. A second layer of material is formed 1114 on the first layer. The first and second layer form a composite layer of the device integrated electrical and/or optical. The procedure may optionally involve forming 1116 one or more additional composite layers on the first composite layer. The procedure involves applying 1118 a heat treatment to cause diffusion between the first layer of material and second layer of material. The application 1118 of heat may be performed with the individual layers are being applied, or may be performed after one or more composite layers have been formed, e.g., annealing the composite layers. The resulting device may have a full or partial mixture of the two materials of the first and second layers.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A near-field transducer, comprising:
a substrate that defines a substrate-parallel plane;
a composite layer deposited on the substrate-parallel plane, the composite layer having a first layer of a plasmonic material and a second layer of an insertion material adjacent the substrate, wherein the insertion material reduces plastic deformation of the near-field transducer at elevated temperatures.

2. The near-field transducer of claim 1, wherein the plasmonic material comprises gold.

3. The near-field transducer of claim 1, wherein the plasmonic material comprises at least one of copper, aluminum, and silver.

4. The near-field transducer of claim 1, wherein the insertion material comprises a refractory metal of low solubility in the plasmonic material.

5. The near-field transducer of claim 4, wherein the insertion material comprises an alloy of refractory metal.

6. The near-field transducer of claim 1, wherein the insertion material comprises a metal oxide.

7. The near-field transducer of claim 1, wherein the insertion material comprises a conductive nitride.

8. The near-field transducer of claim 1, wherein the near-field transducer is formed as two elongated plates with a gap disposed therebetween, the plates disposed on the substrate-parallel plane.

9. The near-field transducer of claim 1, further comprising one or more additional composite layers disposed on the composite layer, the additional composite layers each comprising layers of additional plasmonic material and additional insertion material.

10. A method, comprising:
forming a first layer of an insertion material on a substrate to form a planar structure of a near-field transducer; and
forming a second layer of a plasmonic material on the first layer, wherein the first layer and the second layer form a first composite layer of the near-field transducer, and wherein the insertion material reduces plastic deformation of the near-field transducer at elevated temperatures.

11. The method of claim 10, wherein the plasmonic material comprises gold.

12. The method of claim 10, wherein the insertion material comprises a refractory metal of low solubility in the plasmonic material.

13. The method of claim 12, wherein the insertion material comprises an alloy of refractory metal.

14. The method of claim 10, wherein the insertion material comprises at least one of a metal oxide and a conductive nitride.

15. The method of claim 10, further comprising forming one or more additional composite layers on the first composite layer.

16. The method of claim 10, further comprising directing light onto the near-field transducer to heat a magnetic recording media.

17. The method of claim 10, further comprising applying a heat treatment to cause diffusion between the first layer and the second layer.

18. The method of claim 17, wherein the heat treatment is applied while at least one of the first layer and the second layer is being deposited.

19. The method of claim 17, wherein the heat treatment comprises annealing after the first layer and the second layer have been deposited.

20. A system comprising:
a near-field transducer formed of at least one composite layer, each composite layer having a first layer of plasmonic material and a second layer of an insertion material, wherein the insertion material reduces plastic deformation of the near-field transducer at elevated temperatures;
means for delivering light to the near-field transducer to facilitate heating a spot on a magnetic recording media; and
means for inducing a magnetic field at the heated spot to store data.

* * * * *